United States Patent [19]

Taguchi et al.

[11] 4,263,526
[45] Apr. 21, 1981

[54] AC GENERATOR WITH LOW NOISE CLAW TOOTH ROTOR

[75] Inventors: Masahiro Taguchi; Mitsuo Inagaki, both of Okazaki, Japan

[73] Assignee: Nippon Soken, Inc., Nishio, Japan

[21] Appl. No.: 27,282

[22] Filed: Apr. 4, 1979

[30] Foreign Application Priority Data

Apr. 10, 1978 [JP] Japan ................................. 53-41918

[51] Int. Cl.³ ............................................. H02K 1/22
[52] U.S. Cl. ...................................... 310/263; 310/51
[58] Field of Search ................. 310/51, 263, 180, 193, 310/257, 68 R, 75 R, 49 R

[56] References Cited

U.S. PATENT DOCUMENTS

| 1,108,568 | 8/1914 | Fynn | 310/51 |
| 3,604,961 | 9/1971 | Saldinger | 310/51 |
| 4,155,018 | 5/1979 | Oudet | 310/257 X |

Primary Examiner—Mark O. Budd
Attorney, Agent, or Firm—Cushman, Darby & Cushman

[57] ABSTRACT

An AC generator for a vehicle comprises a rotor having a pair of finger magnetic poles and an armature iron core. By deviating pole pieces of the finger magnetic poles by predetermined angles relative to each of opposed tooth portions of the armature iron core, torque variation applied to each of the pole pieces during rotation is cancelled, and magnetic sound can be greatly decreased without reducing the output of the AC generator.

6 Claims, 6 Drawing Figures

AC GENERATOR WITH LOW NOISE CLAW TOOTH ROTOR

BACKGROUND

The present invention relates to AC generators for vehicles, more particularly to a multiphase, particularly three-phase, AC generator provided with a so-called Lundell type rotor comprising an exciting coil enclosed by a pair of finger magnetic poles having a plurality of pole pieces, respectively. Such a generator is chiefly installed on vehicles, with the rotor driven by an engine thereof.

As is well known in the art, three-phase AC generators (hereinafter simply referred to as ACG) as described above generally have a basic construction such as shown in FIG. 1. In FIG. 1, reference numeral 1 designates an armature iron core of a cylindrical shape, and reference numeral 2 designates three-phase armature windings wound about the iron core 1. The armature assembly comprising these elements is supported within two housings H. Reference numeral 3 designates a three-phase full wave rectifier unit contained in one of the two housings H, for converting the output of the armature windings 2 into DC current.

A Lundell type rotor R is rotatably supported within the housings H and driven, for example, by a crankshaft of an engine (not shown) through a belt and a pulley Q. The rotor R comprises a pair of finger magnetic poles 4N and 4S having a plurality of pole pieces, respectively, which are opposed to the armature iron core 1 through a small gap G, and a cylindrical exciting coil 5 enclosed by the magnetic poles 4N and 4S for energizing them to opposite polarities. Reference character W designates a cooling fan.

When exciting current is applied to the exciting coil 5, a pair of finger magnetic poles 4N and 4S are energized to opposite polarities (N and S show each polarity) and a magnetic flux $\Phi$ flows toward the armature iron core 1.

In general, in an ACG of this type, magnetic poles 4N and 4S having equilateral trapezoidal surfaces opposite to the armature iron core 1 are arranged alternately by an equal pitch with each other, as shown in FIG. 2 where the magnetic structure is developed into a plane. In FIG. 2, reference numeral 11 designates the tooth portions of the armature iron core 1.

Conventionally, it is considered proper and electromagnetically efficient to make the length L of the base of the equilateral trapezium slightly shorter than the pole pitch and to make the length l of the side opposite to the base equal to the width of the tooth portions 11 of the armature iron core 1, to provide a one slot skew. It is also considered that the magnetic sound vibration can be decreased by setting the inclining rate 1 slot skew.

However, in an ACG as described above, there often occurs a problem in that the magnetic sound generated under loaded operation becomes an abnormal sound in the relatively low speed region. The magnetic sound is generated by the vibration of the housings, engine block, and the like, which is caused by the fact that when the finger magnetic poles are excited and rotated to alternately pass the tooth portions of the armature iron core, a torque variation is produced and acts on the armature iron core supported within the housing as an exciting force.

The frequency of the torque variation has a fundamental frequency T·N, which is the product of the total number of the tooth portions of the armature iron core T (generally 36 or 42) and the number of revolutions N, and the integral order harmonics of the fundamental frequency T·N. These are the frequency components of the magnetic sound which is generated in the well known ACG.

Accordingly, an object of the present invention is to provide a polyphase AC generator having an improved rotor pole construction by which magnetic sound is greatly reduced without reduction in output.

Another object of the present invention is to provide a polyphase AC generator having an improved rotor pole by deviating pole pieces relative to an armature iron core and cancelling torque variation which causes magnetic noise.

DESCRIPTION OF THE DRAWINGS

Other objects and advantages of the invention will become apparent from the following description of embodiments with reference to the accompanying drawings wherein.

DETAILED DESCRIPTION

According to the present invention, in order to decrease the magnetic sound which is generated due to the torque variation, at least two pole pieces of at least one of a pair of finger magnetic poles are arranged so as to be deviated relative to the opposed tooth portions of the armature iron core which are arranged at an equal pitch, so that the pole pieces may be passed through the tooth portions of the armature iron core irregularly, when the rotor is rotated. As a result, the torque variation having a fundamental frequency T·N and the integral order harmonics thereof, can be sharply decreased and the magnetic sound generated due to the torque variation can be greatly reduced.

According to the present invention, the deviated angle $\Delta\theta$ of each of the deviated pole pieces relative to the opposed tooth portions in the state where at least one claw-shaped pole piece and at least one tooth portion are positioned at the same angular position with each other is expressed by an equation:

$$\Delta\theta = \frac{\text{one slot pitch angle } (\theta)}{\text{the number of pole pieces to be used for cancelling torque variation } (P)} \times n \qquad (1)$$

where the constant n is all of the integral number from 0 to $(P-1)$

The deviated pole pieces having the deviated angles $\Delta\theta$ are freely arranged. However, it is desirable to arrange them so that the interval between adjacent pole pieces may be as long as possible in order not to lower the output of the ACG.

Figure 1:
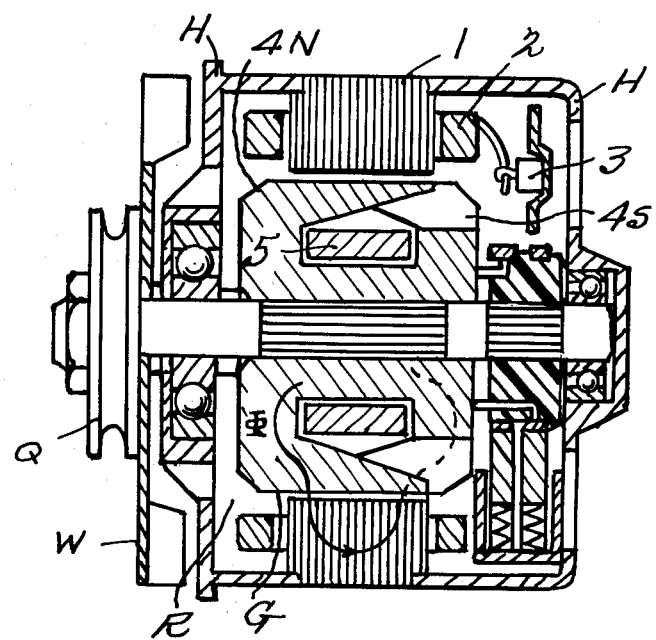
FIG. 1 is a longitudinal sectional view of a conventional
Figure 2:
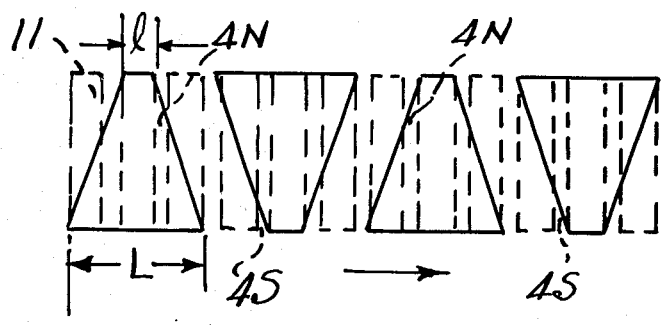
FIG. 2 is a development view of the surface of the finger magnetic poles of the conventional ACG of FIG. 1.
Figure 3:
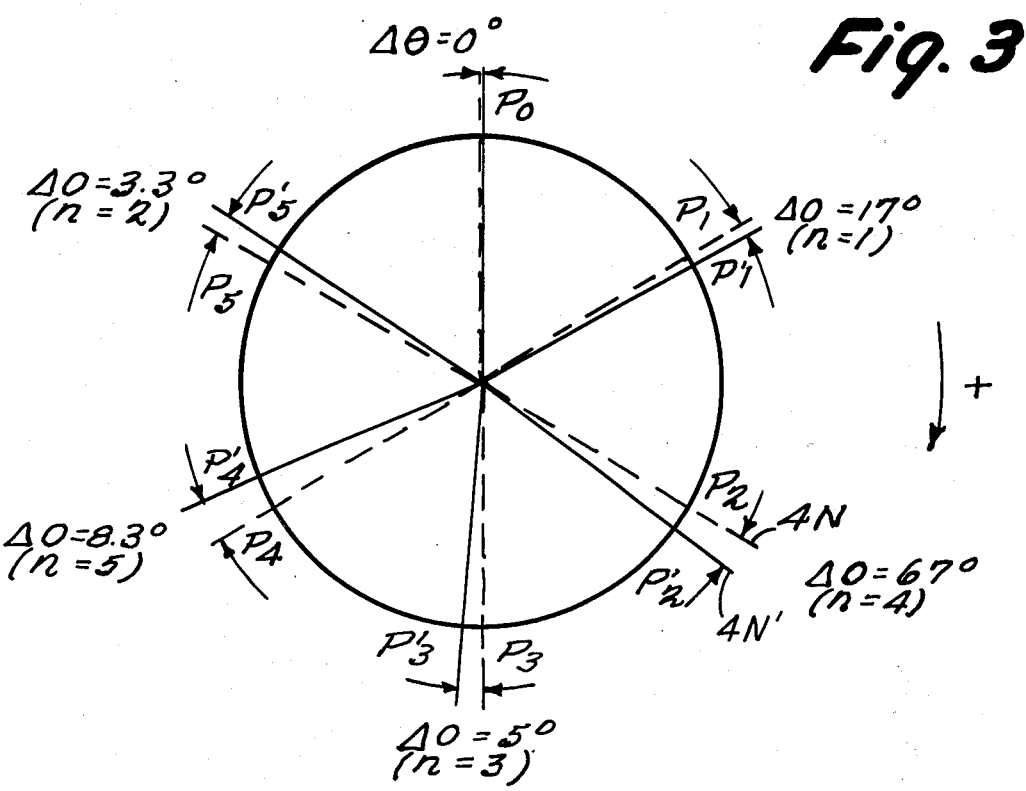
FIG. 3 is a view showing the arrangement of the finger magnetic poles of the first embodiment of the present invention as compared with the conventional ACG.

The first embodiment of the pole piece arrangement in the ACG of the present invention is shown in FIG. 3 as compared with that of the conventional ACG. In this case, the number of pole pieces of each of an N pole and an S pole is 6 and the total number of the tooth portions of the armature iron core is 36. Therefore, one of the pole pieces of the N pole and the S pole is arranged every three tooth portions of the armature iron core.

In FIG. 3, the pole pieces of the finger magnetic pole 4N of the conventional ACG are arranged at an equal pitch, as shown by broken lines. The arrangement of the pole pieces of the finger magnetic pole 4N' of the present invention is shown by solid lines. All of the pole pieces of an N pole (4N') except for one pole piece ($p'_o$) are deviated. The pole pieces of a S pole (4S) are not deviated. And one slot pitch angle ($\theta$) is 10°. The deviated angles $\Delta\theta_1$ to $\Delta\theta_5$ of the deviated pole pieces of the finger magnetic pole 4N' are as follows:

$$\Delta\theta = \frac{10°}{6} \times 0, \frac{10°}{6} \times 1, \frac{10°}{6} \times 2, \frac{10°}{6} \times 3, \frac{10°}{6} \times 4 \text{ and} \quad (2)$$
$$\frac{10°}{6} \times 5$$

The obtained deviated angles of the pole pieces are thus 1.7°, 5.0°, 6.7°, 8.3° and 3.3°, respectively. In FIG. 3, the positions of the pole pieces of the conventional finger magnetic pole 4N are shown by $P_0$ to $P_5$, and those of the finger magnetic pole 4N' of the present invention are shown by $P'_0$ to $P'_5$. The deviated angle is positive in the clockwise direction. The remaining construction of the ACG of the present invention is similar to those of the conventional ACG.

Figure 4:
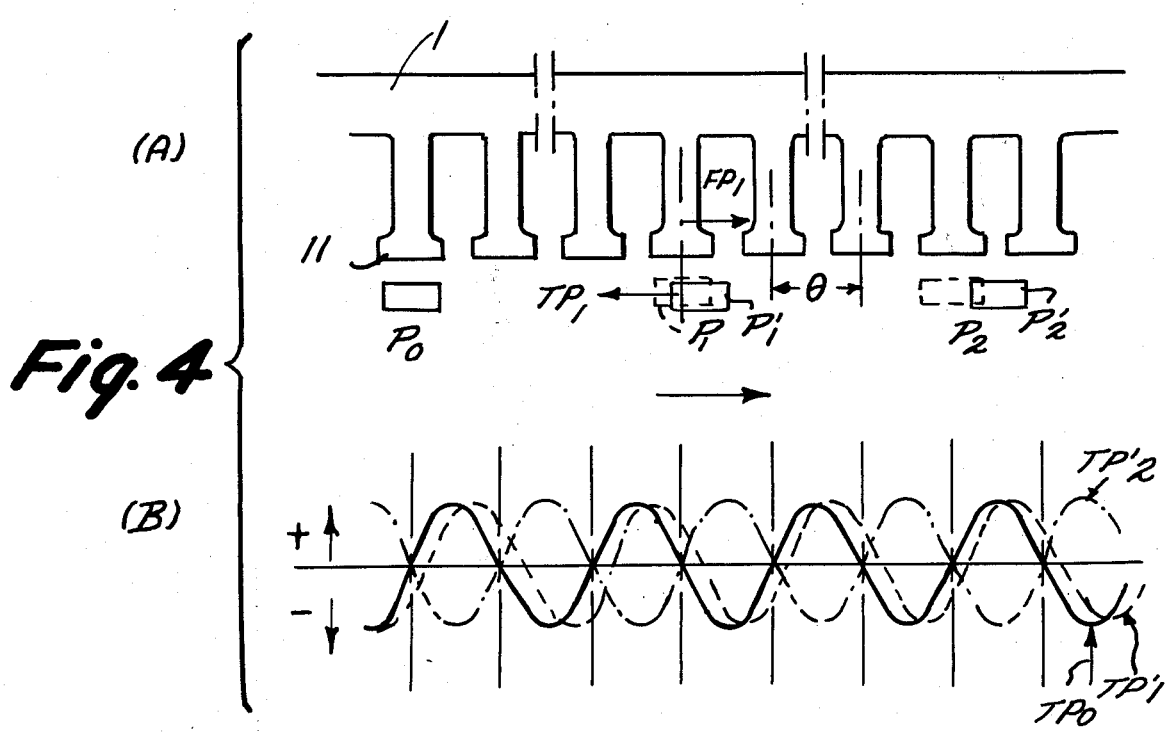
FIG. 4 is a development view showing the relation between the arrangement of the finger magnetic poles and that of the tooth portions of the armature iron core as compared with the conventional ACG.

The torque variation which is generated in the ACG of the present invention including the deviated pole pieces as described above, is shown in FIG. 4. In FIG. 4, the relative position of the pole pieces to the armature iron core is also shown.

In the conventional ACG, the pole pieces $P_0$ to $P_5$ are arranged at an equal pitch with each other relative to the opposed tooth portions of the armature iron core 1, which are arranged at one slot pitch angle of $\theta$ as shown by broken lines in FIG. 4(A). The component of the torque variation is mainly composed of a frequency component of T·N, and the torque variation applied to each of pole pieces has a waveform $TP_0$ as shown in FIG. 4(B).

Since each of the six pole pieces of the pole 4N is passed through the tooth portions of the armature iron core 1 simultaneously, a torque variation six times as large as $TP_0$ is applied to the pole 4N. Since the rotor has a pair of finger magnetic poles 4N and 4S, the torque variation which is applied to the poles 4N and 4S is twelve times as large as $TP_0$.

In contrast, in the finger magnetic pole of the present invention, the pole pieces $P'_1$ to $P'_5$ are disposed so as to be deviated relative to the opposite tooth portions 11 of the armature iron core 11 by $\Delta\theta_1$ to $\Delta\theta_5$ as shown in FIG. 3 and FIG. 4(A). In FIG. 3, the pole piece $P'_1$ is deviated by an angle $\Delta\theta$, which is obtained by a formula $(\theta/P) \times 1$, and $P'_2$ is deviated by an angle $\Delta\theta_2 = (\theta/P) \times 4$. The torque variation applied to each of pole pieces $P'_0$, $P'_1$ and $P'_2$ has torque variation waveform $TP_0$, $TP'_1$ and $TP'_2$ as shown in FIG. 4(B).

The total of the torque variation $TP_0$ to $TP'_5$ generated in each of pole pieces $P_0$ to $P'_5$ becomes 0 as seen from the following equations:

$$TP_0 = T \sin \omega t \quad (3)$$
$$TP_1' = T \sin(\omega t + \Delta\theta_1)$$
$$TP_2' = T \sin(\omega t + \Delta\theta_2)$$
$$TP_3' = T \sin(\omega t + \Delta\theta_3)$$
$$TP_4' = T \sin(\omega t + \Delta\theta_4)$$
$$TP_5' = T \sin(\omega t + \Delta\theta_5)$$
$$\sum_{n=0}^{n=5} TP_n = 0$$

Assuming that the number of pole pieces to be used for cancelling the torque variation is P, the torque variation from the first to the (P−1)th harmonics of the fundamental frequency component of T·N can be cancelled. The occurrence of the magnetic sound due to the torque variation is thus prevented. The torque variation having frequency components not less than (P−1) times as large as that of T·N is of a very high order and of a low level, so that such a variation scarcely affects the armature iron core 1 compared with the other variation.

In the conventional ACG, the magnetic sound is generated due to the variation of the housings, etc. which is caused by the fact that the forces FP as shown in FIG. 4(A) which are generated as reaction forces of the torque variation, which are applied to the finger magnetic poles 4N and 4S, affect the tooth portions 11 of the armature iron core 1 and act as exciting forces to vibrate the housings etc. For the number of revolutions in which the frequency component T·N of the torque variation and the resonance frequency of the housing, etc. coincide with each other, a magnetic sound of a very high level is generated.

FIGS. 3 and 4 ae explained based on the arrangement of the finger magnetic pole 4N. In practice, the finger magnetic pole 4N having deviated pole pieces and pole 4S having undeviated pole pieces are used in combination with each other, so that the distance between adjacent pole pieces of the magnetic poles 4N and 4S must be as large as possible in order to prevent any output drop.

In the first embodiment shown in FIG. 3, the torque variation is cancelled among the pole pieces of the finger magnetic pole 4N. Also, the torque variation can be cancelled among pole pieces of the finger magnetic pole 4S, and among those of the finger magnetic poles 4N and 4S as described in the second and third embodiments of FIGS. 5 and 6.

Figure 5:
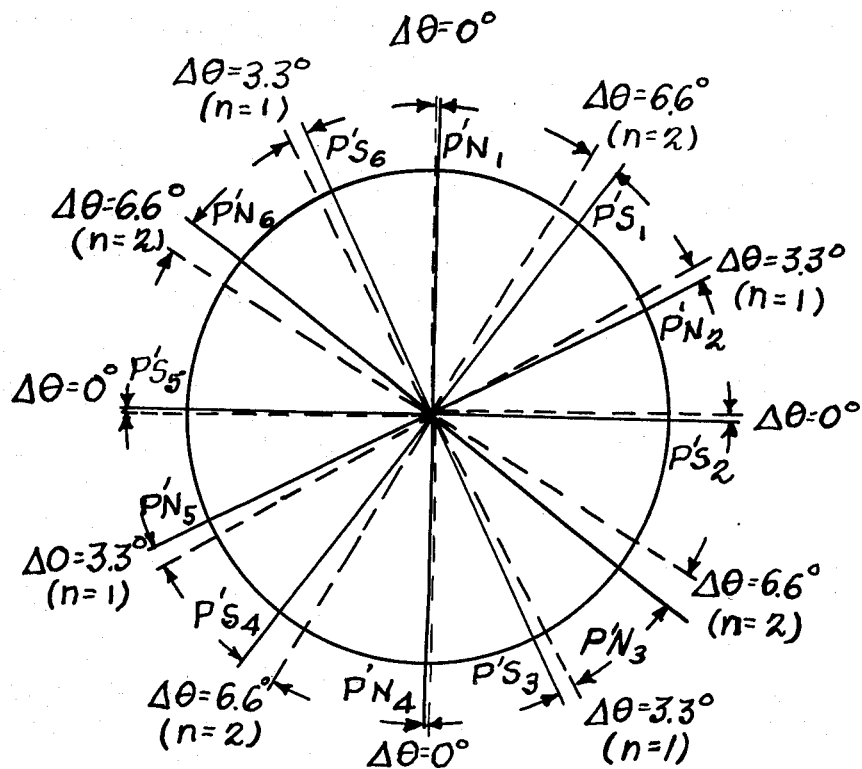
FIG. 5 and FIG. 6 are views showing arrangements of pole pieces of the finger magnetic poles of the second and the third embodiments of the present invention as compared with the conventional ACG.
Figure 6:
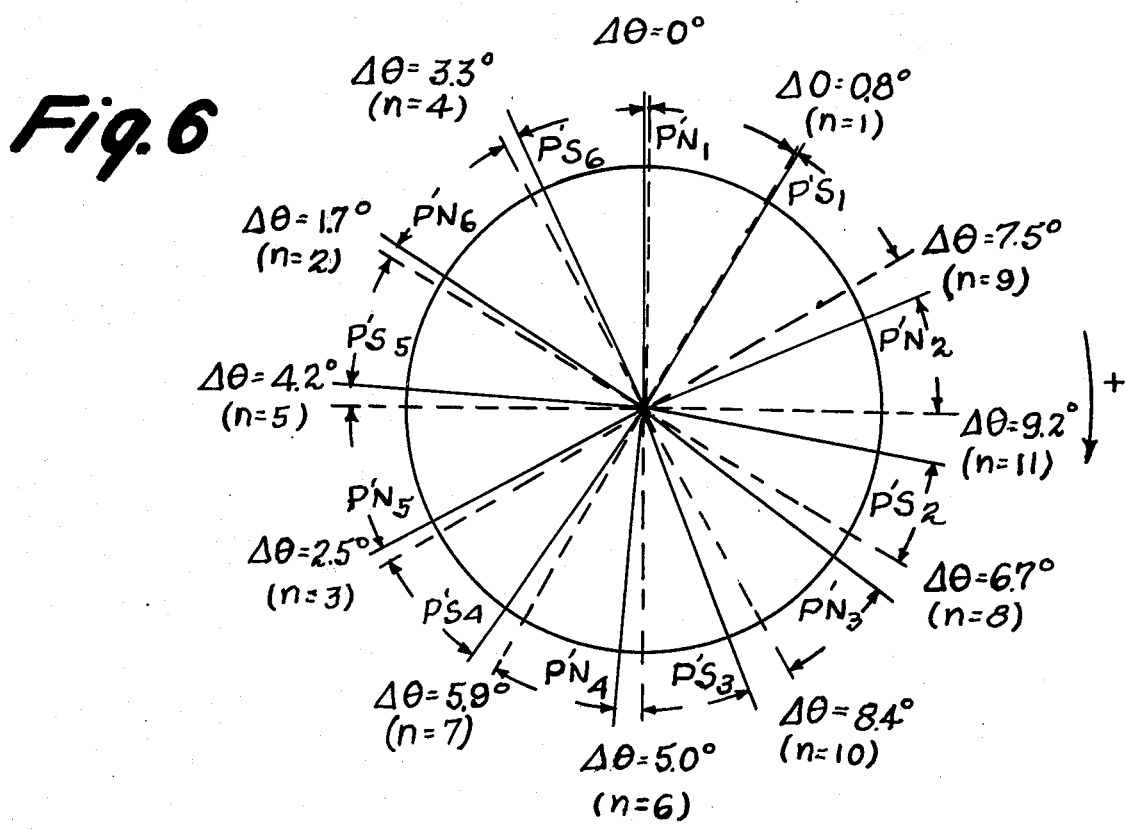

In FIGS. 5 and 6, the finger magnetic poles N and S of the conventional ACG are arranged at an equal pitch with each other as shown by broken lines. The arrangement of the finger magnetic poles 4N and 4S of the present invention is shown by solid lines. In this case, the total number of the tooth portions of the armature iron core is 36, like the first embodiment of FIG. 3. The number of pole pieces of each of the poles 4N and 4S is 6. In the second embodiment shown in FIG. 5, the rotor is divided into four areas of 90° each. By the use of three pole pieces of the finger magnetic poles 4N and 4S which are included in each of the above described four areas of the rotor, the torque variation is cancelled.

For example, in the first area of the rotor, the pole pieces P'N$_1$ and P'N$_2$ of the magnetic pole 4N and the pole piece P'S$_1$ of the magnetic pole 4S cancel the torque variation. The deviated angles of the pole pieces are (10°/3)×1 and (10°/3)×2, namely, 3.3° and 6.6°, respectively. In the second embodiment shown in FIG. 5, the first harmonics and the second harmonics of the fundamental frequency of T·N are cancelled.

In the third embodiment as shown in FIG. 6, all the pole pieces P'N$_2$ to P'N$_6$ of the magnetic pole 4N (six) and all the pole pieces P'S$_1$ to P'S$_6$ of the magnetic pole 4S (six) are deviated to cancel the torque variation. The torque variation from the first to the eleventh harmonics of the fundamental frequency of T·N can be cancelled.

The deviated angles of the pole pieces of the third embodiment of FIG. 6 are (10°/12)×1, (10°/12)×2, (10°/12)×3, (10°/12)×4, (10°/12)×5, (10°/12)×6, (10°/12)×7, (10°/12)×8, (10°/12)×9, (10°/12)×10, and (10°/12)×11, namely, 0.8°, 1.7°, 2.5°, 3.3°, 4.2°, 5.0°, 5.9°, 6.7°, 7.5°, 8.4° and 9.2°, respectively.

In FIGS. 5 and 6, the pole pieces of the magnetic pole 4N are shown by P'N$_1$ to P'N$_6$ and those of the magnetic pole 4S are shown by P'S$_1$ to P'S$_6$, and the deviated angle is positive in the clockwise direction. The other construction details are similar to those of the conventional ACG.

As described above, according to the present invention, the torque variation composed of T·N and the integral order harmonics of T·N can be greatly decreased and the magnetic sound generated due to the torque variation can be sharply lowered. This is achieved by deviating at least two arbitrary pole pieces of at least one of a pair of finger magnetic poles relative to the opposed tooth portions of the armature iron core, which are arranged at an equal pitch with each other, by specific angles so that the pole pieces of the finger magnetic poles irregularly pass through the tooth portions of the armature iron core when they are rotated.

As described above, in the above described embodiments the torque variation is cancelled by deviating the pole pieces of the finger magnetic poles. In addition, by deviating the tooth portions of the armature iron core relative to the magnetic poles, a similar effect to that of the above described embodiments can be achieved.

Having now fully described the invention, it will be apparent to one of ordinary skill in the art that many changes and modifications can be made thereto without departing from the spirit or scope of the invention as set forth herein.

What is claimed is:

1. In an AC generator for a vehicle comprising an armature iron core, three-phase armature windings wound on said armature iron core and a rotor having a pair of finger magnetic poles in the circumference thereof, which is formed with a plurality of claw-shaped pole pieces to be energized to opposite polarities and disposed to oppose tooth portions of said armature iron core with a small gap therebetween, the improvement wherein:

said claw-shaped pole pieces are deviated relative to said opposed tooth portions, thereby to cancel torque variation generated between said claw-shaped pole pieces and said opposed tooth portions and to greatly decrease magnetic sound, the deviated angle ($\Delta\theta$) of each of said deviated claw-shaped pole pieces relative to said opposed tooth portions in the state where at least one claw-shaped pole piece and at least one tooth portion are positioned at the same angular position with each other being expressed by the equation $\Delta\theta=(\theta/P)\times n$, wherein $\theta$ is one slot pitch angle, P is the number of at least two pole pieces to be used for cancelling torque variation and n is a constant of all of the integral numbers from 1 to P-1.

2. An AC generator according to claim 1, wherein P is the total number of pole pieces of at least one of said pair of finger magnetic poles.

3. An AC generator according to claim 1, wherein P is the number of a plurality of pole pieces of at least one of said pair of finger magnetic poles included in each of a plurality of divided areas of said circumference of said rotor having the same angular width with each other.

4. An AC generator according to claims 2 or 3, wherein said at least one of said pair of finger magnetic poles having deviated claw-shaped pole pieces is a N pole.

5. An AC generator according to claims 2 or 3, wherein said at least one of said pair of finger magnetic poles having deviated claw-shaped pole pieces is a S pole.

6. An AC generator according to claims 2 or 3, wherein said at least one of said pair of finger magnetic poles having deviated claw-shaped pole pieces is composed of two of said pair of finger magnetic poles N and S.

* * * * *